(12) United States Patent
Li et al.

(10) Patent No.: US 10,200,531 B2
(45) Date of Patent: Feb. 5, 2019

(54) MITIGATING POTENTIAL FRAUD

(71) Applicant: LENOVO (Singapore) PTE, LTD., New Tech Park (SG)

(72) Inventors: Jian Li, Chapel Hill, NC (US); Ming Qian, Cary, NC (US); Song Wang, Cary, NC (US)

(73) Assignee: LENOVO (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 15/458,663

(22) Filed: Mar. 14, 2017

(65) Prior Publication Data
US 2018/0270348 A1 Sep. 20, 2018

(51) Int. Cl.
*H04M 1/56* (2006.01)
*H04M 15/06* (2006.01)
*H04M 3/22* (2006.01)
*H04W 12/12* (2009.01)
*H04M 3/436* (2006.01)
*H04W 4/16* (2009.01)
*H04M 3/42* (2006.01)

(52) U.S. Cl.
CPC ..... *H04M 3/2281* (2013.01); *H04M 3/42059* (2013.01); *H04M 3/4365* (2013.01); *H04W 4/16* (2013.01); *H04W 12/12* (2013.01)

(58) Field of Classification Search
None
See application file for complete search history.

(56) References Cited

U.S. PATENT DOCUMENTS

| | | | | |
|---|---|---|---|---|
| 6,801,606 B1* | 10/2004 | Edwards | ............... | H04M 15/47 379/114.14 |
| 7,327,837 B1* | 2/2008 | Harlow | ............... | H04M 3/2281 379/114.14 |
| 7,480,631 B1* | 1/2009 | Merced | ............. | G06Q 20/3674 235/380 |
| 8,085,915 B2* | 12/2011 | Reumann | ......... | H04L 29/06027 370/352 |
| 9,060,057 B1* | 6/2015 | Danis | ................ | H04M 3/42059 |
| 2008/0084975 A1* | 4/2008 | Schwartz | ............. | H04M 3/436 379/88.22 |
| 2012/0015639 A1* | 1/2012 | Trivi | ..................... | H04M 3/436 455/415 |
| 2013/0290136 A1* | 10/2013 | Sheets | ............... | G06Q 30/0609 705/26.35 |
| 2014/0286484 A1* | 9/2014 | Ehrlich | ................ | H04M 3/436 379/142.06 |
| 2015/0269946 A1* | 9/2015 | Jones | ..................... | G10L 17/22 704/273 |
| 2017/0061968 A1* | 3/2017 | Dalmasso | ............... | G10L 17/08 |

\* cited by examiner

*Primary Examiner* — Quoc D Tran
(74) *Attorney, Agent, or Firm* — Kunzler, PC

(57) ABSTRACT

For mitigating potential fraud, a processor detects potential fraud in a communication from a caller through a communication device. The processor further generates a fraud alert in response to the potential fraud. In addition, the processor mitigates the potential fraud in response to a fraud policy being satisfied.

20 Claims, 9 Drawing Sheets

MITIGATING POTENTIAL FRAUD

FIELD

The subject matter disclosed herein relates to mitigating potential fraud.

BACKGROUND

Description of the Related Art

A caller to a communication device may attempt to perpetrate a fraud.

BRIEF SUMMARY

An apparatus for mitigating potential fraud is disclosed. The apparatus includes a communication device, a processor, and a memory that stores code executable by the processor. The processor detects potential fraud in a communication from a caller through the communication device. The processor further generates a fraud alert in response to the potential fraud. In addition, the processor mitigates the potential fraud in response to a fraud policy being satisfied. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
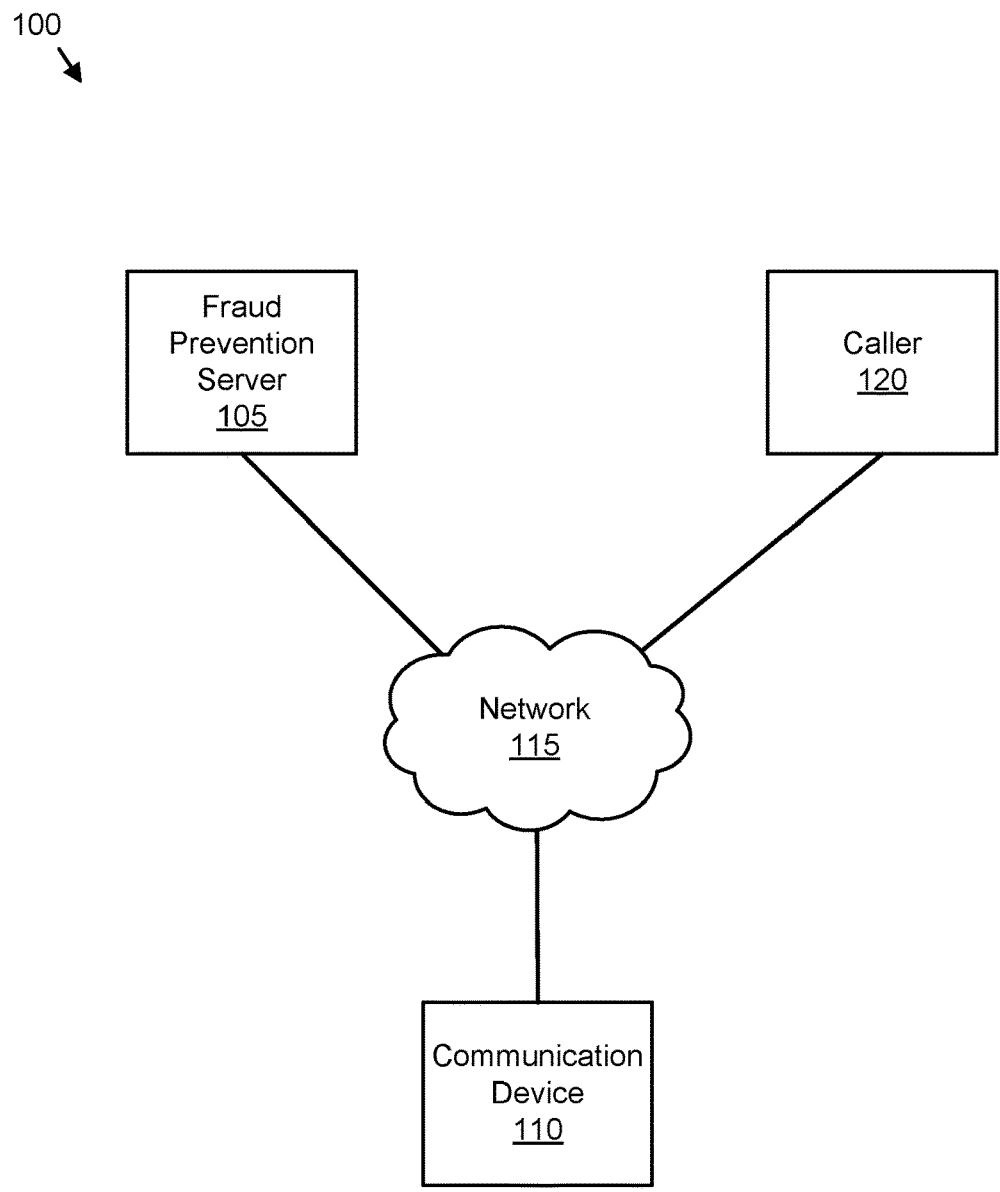
FIG. 1 is a schematic block diagram illustrating one embodiment of a fraud mitigation system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating one embodiment of a fraud mitigation system 100. The system 100 may mitigate a potential fraud perpetrated by a caller 120 to a communication device 110. In the depicted embodiment, the system 100 includes a fraud prevention server 105, a network 115, and a communication device 110. The network 115 may be a mobile telephone network, a landline telephone network, the Internet, a Wi-Fi network, a local area network, a wide-area network, or combinations thereof.

A caller 120 may communicate with the user through the network 115 and the communication device 110. The caller 120 may attempt to perpetrate a fraud upon the user. Unfortunately, the user may have difficulty detecting the fraud because of the sophistication of the fraud and/or because the fraud plays upon the user's emotions. As a result, the user may fall victim to the fraud.

Frauds may follow identifiable patterns. Unfortunately, the identifiable patterns may be difficult to distinguish from a genuine emergency and/or opportunity. The embodiments described herein detect potential fraud in the communication from the caller 120 through the communication device 110 and generate a fraud alert. The fraud alert may include a targeted question that will help to identify the potential fraud. As a result, the potential fraud is more easily identified by the system 100. Once the potential fraud is identified, the system 100 may mitigate the potential fraud. In one embodiment, potential fraud is mitigated in response to a fraud policy being satisfied as will be described hereafter.

Figure 2A:
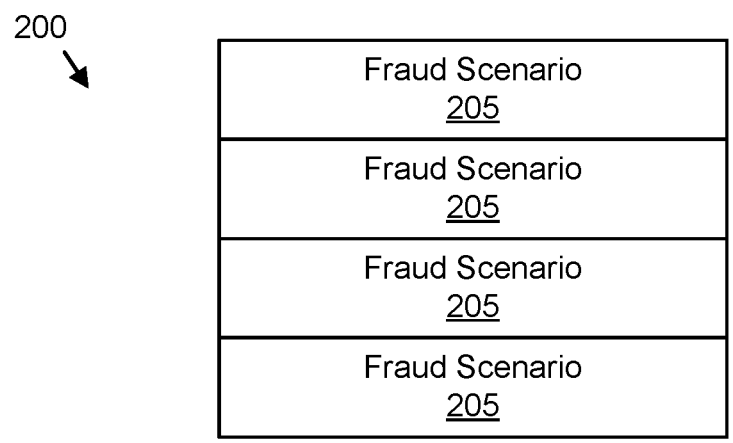
FIG. 2A is a schematic block diagram illustrating one embodiment of a fraud database.

FIG. 2A is a schematic block diagram illustrating one embodiment of a fraud database 200. The fraud database 200 maybe organized as one or more data structures in a memory. The fraud database 200 may reside on the fraud prevention server 105, the communication device 110, or combinations thereof. In the depicted embodiment, the fraud database 200 comprises a plurality of fraud scenarios 205.

Figures 2B, 2C:
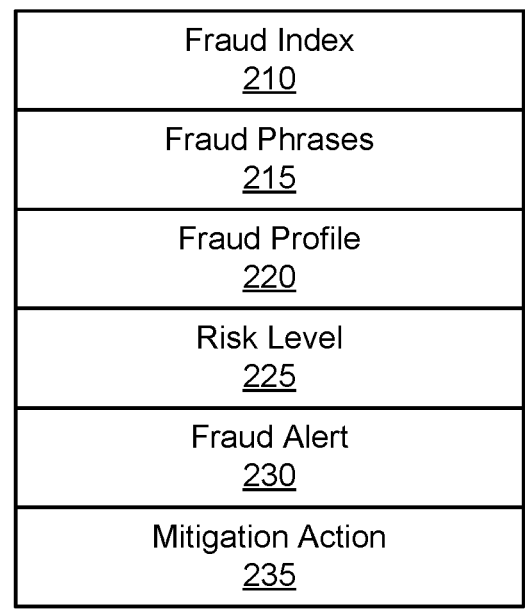
FIG. 2B is a schematic block diagram illustrating one embodiment of a fraud scenario.
FIG. 2C is a schematic block diagram illustrating one embodiment of a user profile.

FIG. 2B is a schematic block diagram illustrating one embodiment of the fraud scenario 205. The fraud scenario 205 may describe a specific type of fraud. The fraud scenario 205 may be organized as a data structure in a memory. In the depicted embodiment, the fraud scenario 205 includes a fraud index 210, fraud phrases 215, a fraud profile 220, a risk level 225, a fraud alert 230, and a mitigation action 235.

The fraud index 210 may identify the fraud scenario 205 within the fraud database 200. The fraud phrases 215 may comprise one or more phrases that may be used by the perpetrator of a fraud. In one embodiment, each of the one or more phrases is associated with a risk value. The risk value may indicate a likelihood of potential fraud and may be used to calculate the risk level 225.

The fraud profile 220 may describe one or more conditions that are associated with the fraud. Each condition may be associated with the risk value. The fraud profile 220 may describe the typical victim for the fraud type, one or more typical sequences in which the fraud phrases 215 are employed by a perpetrator caller 120, a description of typical perpetrators, and the like. The fraud profile 220 and the fraud phrases 215 may be used to identify a conversation as a potential fraud.

The risk level 225 may estimate a likelihood that a conversation is part of a potential fraud. The risk level 225 may be calculated as a function of the fraud phrases 215 and the fraud profile 220. In one embodiment, the risk level RL 225 is calculated using Equation 1, where RV are risk values associated with detected fraud phrases 215 and fraud profiles 220 and n is a number of detected fraud phrases 215 and fraud profiles 220.

$$RL = (\Sigma RV) * \sqrt{n} \qquad \text{Equation 1}$$

The fraud alert 230 may be communicated to the user through the communication device 110 in response to detecting the potential fraud. The fraud alert 230 may comprise one or more of a visual alert, an audible alert, and a vibration alert. In one embodiment, the fraud alert 230 warns the user of the potential fraud. In addition, the fraud alert 230 may comprise a targeted question. The targeted question may be for the caller 120. The targeted question may be communicated to the user and the user may ask the targeted question of the caller 120. Alternatively, the targeted question may be communicated directly to the caller 120 by the communication device 110 and/or by the fraud prevention server 105. A response to the targeted question may determine in part whether a fraud policy is satisfied.

In one embodiment, the targeted question is for a user of the communication device 110. The targeted question may help the user clarify his thinking. In addition, a response to the targeted question may determine in part whether the fraud policy is satisfied.

The mitigation action 235 may specify one or more actions that are taken by the communication device 110 and/or the fraud prevention server 105 in response to a potential fraud satisfying the fraud policy. The actions mitigating the potential fraud may comprise one or more of generating background noise to mask the communication, terminating the communication, blocking outgoing communication, and blocking incoming communication. In one embodiment, only outgoing communication to the caller 120 is blocked. In addition, only incoming communication from the caller 120 may be blocked.

FIG. 2C is a schematic block diagram illustrating one embodiment of a user profile 250. The user profile 250 may describe the user of the communication device 110. The user profile 250 may describe the user's age, occupation, extended family, demographic information, and the like. In one embodiment, the user profile 250 stores a frequency histogram of communications between the user and members of the user's extended family.

The user profile 250 may be used to calculate the risk level RL 225. In one embodiment, the risk level 225 is calculated using Equation 2, where UP is the user profile 250, FP is the fraud profile 220, and K is a nonzero constant, and UP∩FP is a number of elements in common between the user profile 250 and the fraud profile 220.

$$RL = K(UP \cap FP) \qquad \text{Equation 2}$$

Figures 2D, 2E:
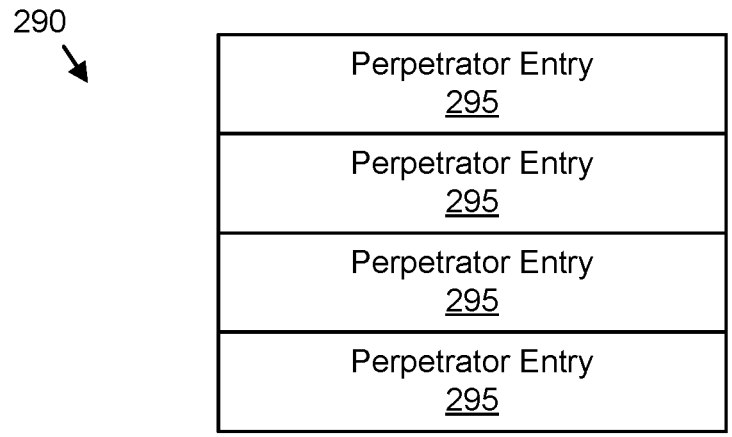
FIG. 2D is a schematic block diagram illustrating one embodiment of a perpetrator database.
FIG. 2E is a schematic block diagram illustrating one embodiment of a fraud policy.

FIG. 2D is a schematic block diagram illustrating one embodiment of a perpetrator database 290. The perpetrator database 290 may store information about one or more perpetrator callers 120. The perpetrator database 290 may be organized as one or more data structures in a memory. In the depicted embodiment, the perpetrator database 290 includes a plurality of perpetrator entries 295. Each perpetrator entry 295 may include a phone number and/or email for specified perpetrator. In addition, each perpetrator entry 295 may describe one or more frauds linked to the specified perpetrator.

FIG. 2E is a schematic block diagram illustrating one embodiment of a fraud policy 285. The fraud policy 285 may be organized as a data structure in a memory. The fraud policy 285 may include one or more conditions that if satisfied indicate that the potential fraud should be mitigated.

Figure 3A:
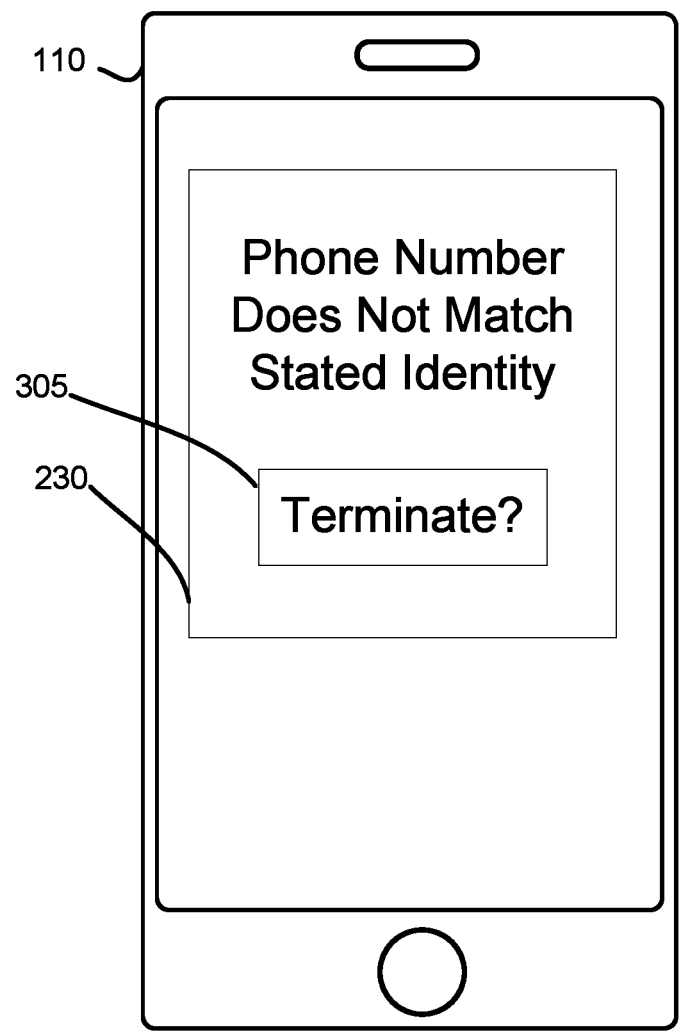
FIG. 3A is a front view drawing illustrating one embodiment of a communication device displaying a fraud alert.

FIG. 3A is a front view drawing illustrating one embodiment of a communication device 110 displaying a fraud alert 230. In the depicted embodiment, the fraud alert 230 is displayed on a mobile telephone communication device 110. The fraud alert 230 notifies the user that the phone number of the caller 120 does not match the stated identity of the caller 120. In addition, the fraud alert 230 gives the user the opportunity to terminate the communication with the caller 120 by selecting the terminate button 305.

Figure 3B:
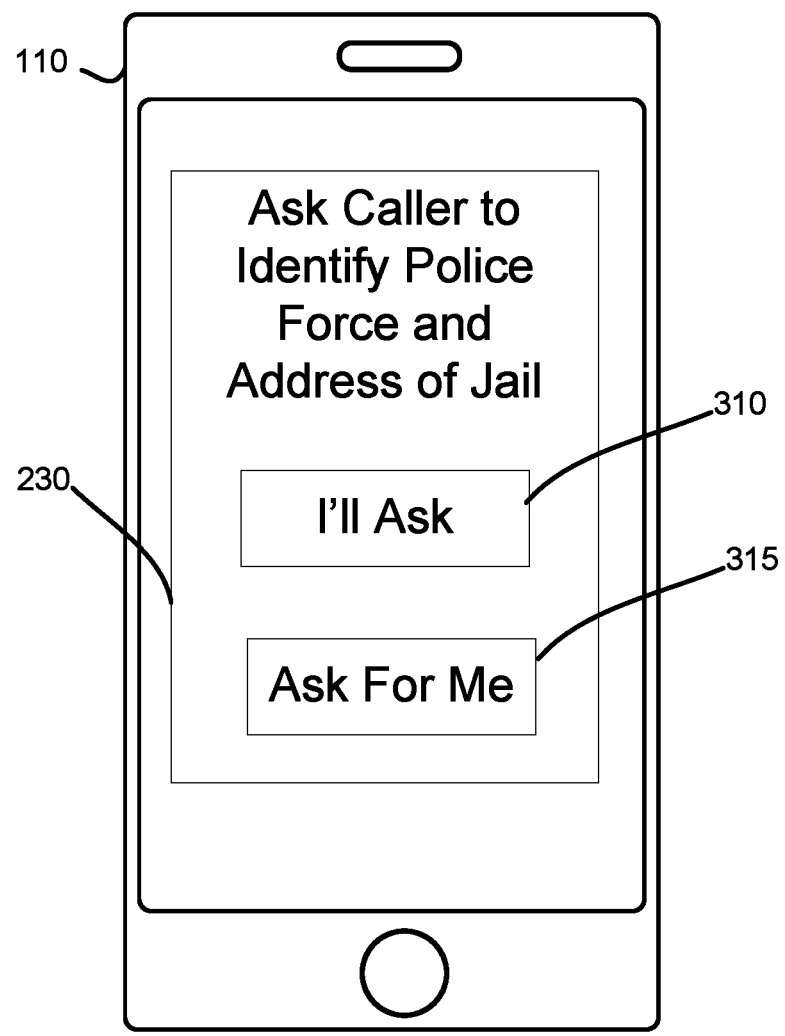
FIG. 3B is a front view drawing illustrating one alternate embodiment of a communication device displaying a fraud alert.

FIG. 3B is a front view drawing illustrating one alternate embodiment of a communication device displaying a fraud alert 230. In the depicted embodiment, the fraud alert 230 requests that the user ask the caller 120 a targeted question to identify a police force and address of a jail, information that may be germane to determining whether the communication is a potential fraud. The user may ask the caller 120 the targeted question and indicate this intention by pressing the "I'll ask" button 310. Alternatively, the user may direct the communication device 110 to ask the targeted question of the fraud alert 230 by selecting the "ask for me" button 315.

Figure 4A:
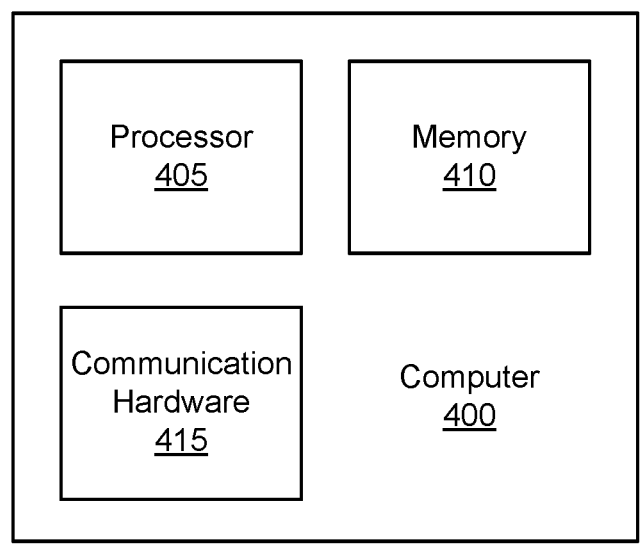
FIG. 4A is a schematic block diagram illustrating one embodiment of a computer.

FIG. 4A is a schematic block diagram illustrating one embodiment of a computer 400. The computer 400 may be embodied in the fraud prevention server 105, the communication device 110, or combinations thereof. In the depicted embodiment, the computer 400 includes a processor 405, a memory 410, and communication hardware 415. The memory 410 may include a semiconductor storage device, hard disk drive, an optical storage device, a micromechanical storage device, or combinations thereof. The memory 410 may store code. The processor 405 may execute the code. The communication hardware 415 may communicate with other devices such as the network 115.

Figure 4B:
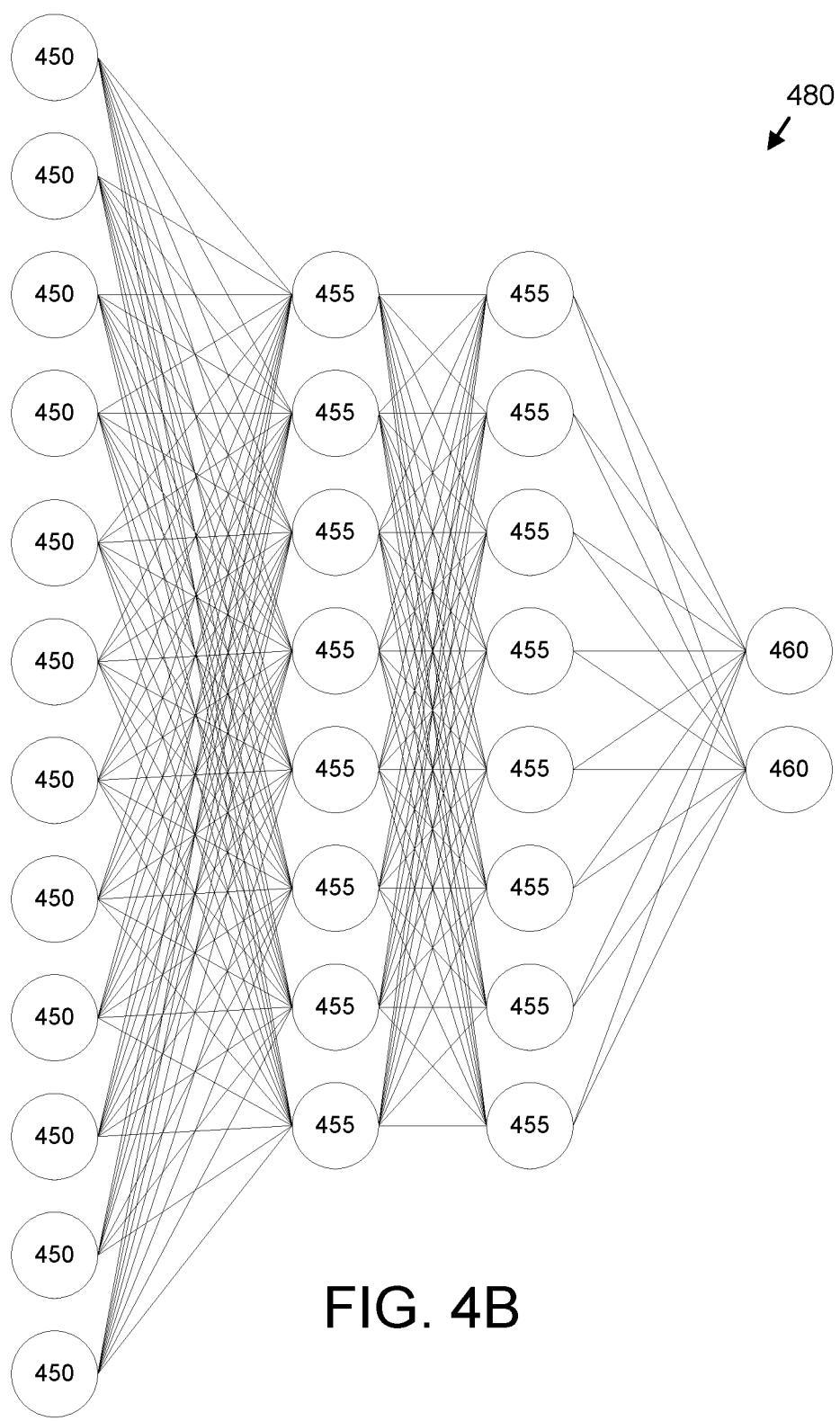
FIG. 4B is a schematic drawing illustrating one embodiment of a neural network.

FIG. 4B is a schematic drawing illustrating one embodiment of a neural network 480. In the depicted embodiment, the neural network 480 includes a plurality of input nodes 450, a plurality of hidden nodes 455, and a plurality of output nodes 460. The plurality of input nodes 450 receives inputs and communicates the inputs to the plurality of hidden nodes 455. The plurality of hidden nodes 455 may be organized in one or more arrangements. One or more of the plurality of hidden nodes 455 are in communication with the output nodes 460.

In one embodiment, training data comprising one or more fraud scenarios 205 is received by the input nodes 450 while risk levels 225 for the output nodes 460 are specified. The hidden nodes 455 may be iteratively trained to generate specified values at the output nodes 460 for the training data. In addition, communication data comprising fraud phrases 215 and the fraud profile 220 may be presented to the input nodes 450. The hidden nodes 455 may process the communication data and generate a prediction for the risk level 225 at the output nodes 460.

Figure 5:
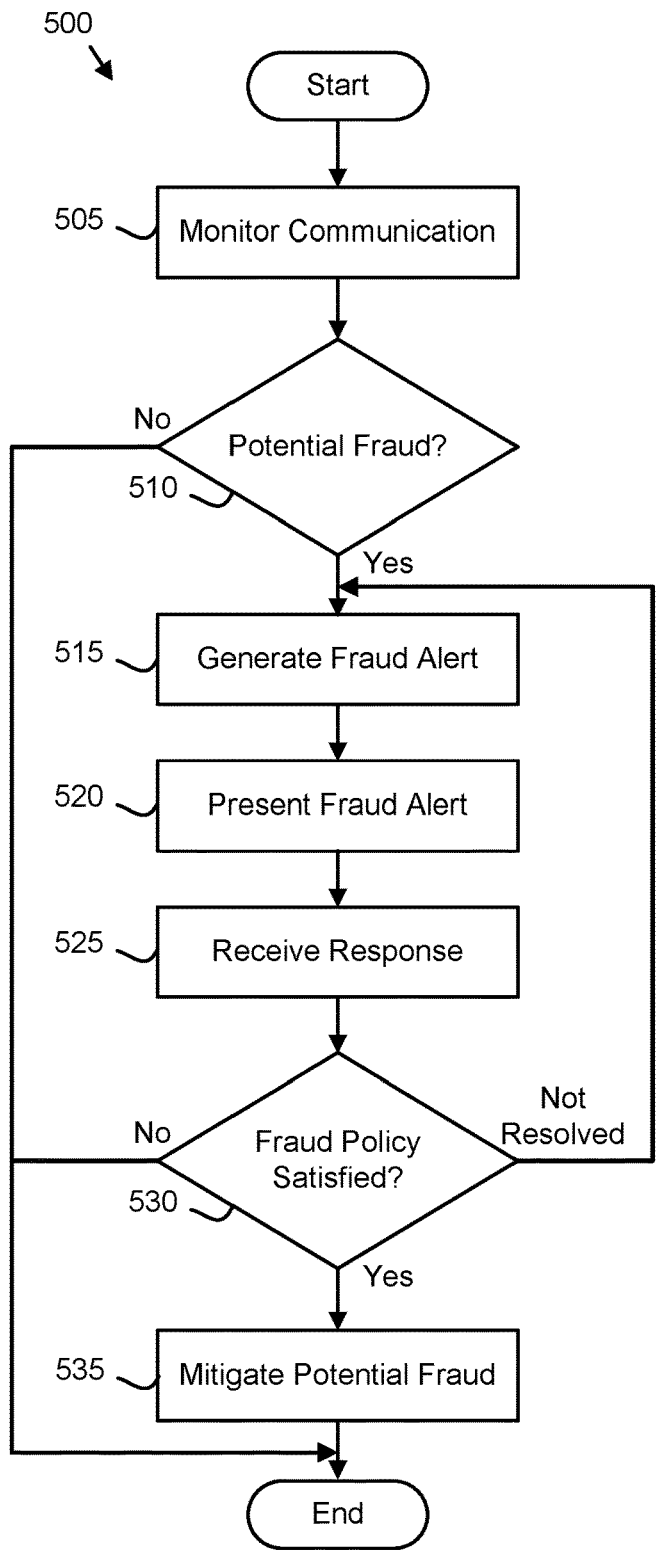
FIG. 5 is a schematic flow chart diagram illustrating one embodiment of a potential fraud mitigation method.

FIG. 5 is a schematic flow chart diagram illustrating one embodiment of a potential fraud mitigation method 500. The method 500 may identify a potential fraud and mitigate the potential fraud. The method 500 may be performed by a computer 400 and/or processor 405 of one or more of the fraud prevention server 105 and the communication device 110.

The method 500 starts, and in one embodiment, the processor 405 monitors 505 communications between the caller 120 and a user through the communication device 110. In one embodiment, the processor 405 converts the speech of the communication to text. In addition, the processor 405 may apply natural language processing to the text of the communication. In one embodiment, the processor 405 identifies the fraud phrases 215 in the communication. The fraud phrases 215 may be identified from a table of fraud phrases 215.

The processor 405 may further identify the fraud profile 220. In one embodiment, the fraud profile 220 is generated as a path of a decision tree, where each node of the path is a question or statement of the caller 120 and each branch is a statement and/or question from the user.

The processor 405 may further detect 510 a potential fraud in the communication from the caller 120 through the communication device 110. In one embodiment, the processor 405 calculates the risk level 225 for the communication as a function of the fraud phrases 215 and the fraud profile 220. In addition, the processor 405 may calculate the risk level 225 using the neural network 480. The processor 405 may determine 510 that the communication is a potential fraud if the risk level 225 exceeds a risk threshold. The risk threshold may be a numerical risk threshold. Alternatively, the risk threshold may be a qualitative risk threshold such as "low," "medium," and "high."

In one embodiment, the potential fraud is detected 510 in response to the caller 120 not matching a call identity for the caller 120. In addition, the potential fraud may be detected 510 in response to the caller 120 matching the perpetrator database 290. In one embodiment, the potential fraud may be detected 510 in response to the caller 120 matching a perpetrator entry 295 in the perpetrator database 290.

If the processor 405 does not detect 510 the potential fraud, the method 500 ends. If the processor 405 detects 510 the potential fraud, the processor 405 may further generate 515 a fraud alert 230. The fraud alert 230 may include a targeted question. The targeted question may be directed to the caller 120. Alternatively, the targeted question may be directed to the user. The targeted question may be designed to further clarify whether the communication is a potential fraud 230. Table 1 lists representative targeted questions.

TABLE 1

I will require at least six days for your check to clear before I can make purchases or transfer money. Is this acceptable?
Can you please deduct the taxes and fees from my winnings/refund?
Please provide me with your contact information so I can call you in 15 minutes.
Please identify the organization you are calling from.

The processor 405 may present 520 the fraud alert 230. In one embodiment, the fraud alert 230 is presented 520 to the user. The user may respond directly to the fraud alert 230. Alternatively, the fraud alert 230 may prompt the user to ask a targeted question to the caller 120. In one embodiment, the communication device 110 may present 520 the targeted question directly to the caller 120 using a text message and/or using speech synthesis. In a certain embodiment, the communication device 110 may receive permission from the user before presenting 520 the targeted question directly to the caller 120.

The processor 405 may further receive 525 a response to the targeted question from the caller 120. The response may be directed to the user. Alternatively, the response may be directed to the communication device 110.

The processor 405 may determine 530 if the fraud policy 285 is satisfied. In one embodiment, the fraud policy 285 is satisfied based in part on a response to the targeted question. For example, if the response to the targeted question is consistent with a potential fraud, the fraud policy 285 may be satisfied.

If the processor 405 determines 530 that the fraud policy 285 is not satisfied, the method 500 ends. If the processor 405 determines 530 that the fraud policy is not conclusively resolved, the processor 405 may generate 515 an additional fraud alert 230 that is communicated to the user and/or to the caller 120. The additional fraud alert 230 may gather additional information in order to determine 530 if the fraud policy is satisfied.

If the processor 405 determines 530 that the fraud policy 285 is satisfied, the processor 405 may mitigate 535 the potential fraud and the method 500 ends. In one embodiment, the processor 405 generates background noise at the communication device 110 to mask the communication. In a certain embodiment, the processor 405 terminates the communication between the caller 120 and the communication device 110. In addition, the processor 405 may block incoming communication to the communication device 110. In one embodiment, only incoming communication from the caller 120 is blocked. In a certain embodiment, incoming communication from an area code of the caller 120 is blocked. In addition, all communication to the communication device 110 may be blocked for a specified time interval of not more than 15 minutes.

The embodiments detect the potential fraud in the communication between the caller 120 and the communication device 110 and generate the fraud alert 230. The fraud alert 230 may comprise one or more targeted questions. Responses to the targeted questions may clarify if the fraud policy 285 is satisfied. If the fraud policy 285 is satisfied, the embodiments mitigate the potential fraud. Thus, potential fraud is more accurately detected.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a communication device;
   a processor;
   a memory that stores code executable by the processor to:
   detect potential fraud in a communication from a caller through the communication device by calculating a risk level for the communication as a function of a number of elements in common between a user profile comprising one or more of a user's age, occupation, extended family, and demographic information and a fraud profile;
   generate a fraud alert in response to the potential fraud, wherein the fraud alert comprises a targeted question that further clarifies whether the communication is a potential fraud by querying about financial arrangements;
   present the fraud alert to a user of the communication device, wherein the fraud alert prompts the user to ask the targeted question of the caller;
   receive a response to the targeted question;
   determine whether a fraud policy is satisfied at the communication device based on the response to the targeted question; and
   mitigate the potential fraud in response to the fraud policy being satisfied.

2. The apparatus of claim 1, wherein the fraud alert further comprises one or more of a visual alert, an audible alert, and a vibration alert.

3. The apparatus of claim 1, wherein the fraud alert further comprises a second targeted question communicated from the communication device to the caller and wherein the fraud policy is satisfied based in part on a response to the second targeted question.

4. The apparatus of claim 1, wherein the fraud alert further comprises a third targeted question for the user of the communication device and wherein the fraud policy is satisfied based in part on a response to the third targeted question.

5. The apparatus of claim 1, wherein mitigating the potential fraud comprises one or more of generating background noise to mask the communication, terminating the communication, blocking outgoing communication, and blocking incoming communication.

6. The apparatus of claim 1, wherein the potential fraud is detected using a neural network that is trained with a plurality of fraud scenarios.

7. The apparatus of claim 1, wherein the potential fraud is further detected in response to the caller not matching a call identity.

8. The apparatus of claim 1, wherein the potential fraud is further detected in response to the caller matching a perpetrator database.

9. A method comprising:
   detecting, by use of a processor, potential fraud in a communication from a caller through a communication device by calculating a risk level for the communication as a function of a number of elements in common between a user profile comprising one or more of a user's age, occupation, extended family, and demographic information and a fraud profile;
   generating a fraud alert in response to the potential fraud, wherein the fraud alert comprises a targeted question that further clarifies whether the communication is a potential fraud by querying about financial arrangements;
   presenting the fraud alert to a user of the communication device, wherein the fraud alert prompts the user to ask the targeted question of the caller;
   receiving a response to the targeted question;
   determining whether a fraud policy is satisfied at the communication device based on the response to the targeted question; and
   mitigating the potential fraud in response to the fraud policy being satisfied.

10. The method of claim 9, wherein the fraud alert further comprises one or more of a visual alert, an audible alert, and a vibration alert.

11. The method of claim 9, wherein the fraud alert further comprises a second targeted question communicated from the communication device to the caller and wherein the fraud policy is satisfied based in part on a response to the second targeted question.

12. The method of claim 9, wherein the fraud alert comprises a third targeted question for the user of the communication device and wherein the fraud policy is satisfied based in part on a response to the third targeted question.

13. The method of claim 9, wherein mitigating the potential fraud comprises one or more of generating background noise to mask the communication, terminating the communication, blocking outgoing communication, and blocking incoming communication.

14. The method of claim 9, wherein the potential fraud is detected using a neural network that is trained with a plurality of fraud scenarios.

15. The method of claim 9, wherein the potential fraud is detected in response to the caller not matching a call identity.

16. The method of claim 9, wherein the potential fraud is further detected in response to the caller matching a perpetrator database.

17. A program product comprising a non-transitory computer readable storage medium that stores code executable by a processor, the executable code comprising code to perform:
   detecting potential fraud in a communication from a caller through a communication device by calculating a risk level for the communication as a function of a number of elements in common between a user profile comprising one or more of a user's age, occupation, extended family, and demographic information and a fraud profile;
   generating a fraud alert in response to the potential fraud, wherein the fraud alert comprises a targeted question that further clarifies whether the communication is a potential fraud by querying about financial arrangements;

presenting the fraud alert to a user of the communication device, wherein the fraud alert prompts the user to ask the targeted question of the caller;

receiving a response to the targeted question;

determining whether a fraud policy is satisfied at the communication device based on the response to the targeted question; and mitigating the potential fraud in response to the fraud policy being satisfied.

18. The program product of claim 17, wherein the fraud alert further comprises one or more of a visual alert, an audible alert, and a vibration alert.

19. The program product of claim 17, wherein the fraud alert further comprises a second targeted question communicated from the communication device to the caller and wherein the fraud policy is satisfied based in part on a response to the second targeted question.

20. The program product of claim 17, wherein the fraud alert further comprises a third targeted question for the user of the communication device and wherein the fraud policy is satisfied based in part on a response to the third targeted question.

* * * * *